(12) United States Patent
Kawana (10) Patent No.: US 11,438,482 B2
(45) Date of Patent: Sep. 6, 2022

(54) CONTROLLING AN IMAGE FORMING DEVICE VIA A WEB APPLICATION

(71) Applicant: CANON KABUSHIKI KAISHA, Tokyo (JP)

(72) Inventor: Yoshimasa Kawana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 16/805,022

(22) Filed: Feb. 28, 2020

(65) Prior Publication Data
US 2020/0288035 A1 Sep. 10, 2020

(30) Foreign Application Priority Data

Mar. 4, 2019 (JP) .............................. JP2019-038207

(51) Int. Cl.
*H04N 1/32* (2006.01)
*H04N 1/44* (2006.01)
*H04N 1/00* (2006.01)

(52) U.S. Cl.
CPC ..... *H04N 1/32101* (2013.01); *H04N 1/00464* (2013.01); *H04N 1/4406* (2013.01)

(58) Field of Classification Search
None
See application file for complete search history.

(56) References Cited

U.S. PATENT DOCUMENTS

| | | | |
|---|---|---|---|
| 7,081,969 B1 * | 7/2006 | Motamed | G06F 3/1208 |
| | | | 358/1.15 |
| 2003/0088793 A1 * | 5/2003 | Parry | H04L 41/22 |
| | | | 726/6 |
| 2006/0279775 A1 * | 12/2006 | Matsumoto | G06F 3/1261 |
| | | | 358/1.15 |
| 2013/0141746 A1 * | 6/2013 | Miller | H04N 1/00307 |
| | | | 358/1.14 |
| 2019/0238712 A1 * | 8/2019 | Nagasaki | G06Q 10/00 |
| 2020/0174715 A1 * | 6/2020 | Kohata | G06F 3/1231 |

FOREIGN PATENT DOCUMENTS

JP 2014-215672 A 11/2014

OTHER PUBLICATIONS

MS Windows 10 Print Settings (Year: 2018).*

* cited by examiner

*Primary Examiner* — Eric A. Rust
(74) *Attorney, Agent, or Firm* — Canon U.S.A., Inc. IP Division

(57) ABSTRACT

An information processing apparatus on which a web browser is executed, the information processing apparatus causes to, in a case where a web site including a web application is accessed from the information processing apparatus, perform an acquisition request to an operating system to acquire information on each connected device if an access request to access a connected device connected to the information processing apparatus is executed based on the web application, provide a first screen for selection of a connected device, access to which is permitted to the web application, from a list of information on connected devices acquired based on the acquisition request, provide a second screen for setting of an identification name corresponding to the selected connected device; and store, in a storage area, information on the selected connected device and an identification name set in the second screen in association with each other.

10 Claims, 11 Drawing Sheets

CONTROLLING AN IMAGE FORMING DEVICE VIA A WEB APPLICATION

BACKGROUND

Field of the Disclosure

The present disclosure relates to a technique that controls a device via a web application.

Description of the Related Art

In recent years, web universal serial bus (USB) application programming interface (API) has been proposed as new web standard by World Wide Web Consortium (W3C). In the related art, to use a USB device via a computer, it is necessary to acquire a driver for the device and to install the driver in an operating system (OS) of the computer. In addition, it is necessary to connect and use the USB device from a dedicated native application.

The processing executed by the native application is often performed by a web application.

Using the USB device connected to the computer via the web application is complicated since the procedure includes creating a plugin for a dedicated browser and using the driver installed in the OS is necessary.

In WebUSB, a program corresponding to the existing USB device driver can be downloaded and used ad hoc as a JavaScript® program, the USB device connected to the computer can be accessed via the web application.

Japanese Patent Application Laid-Open No. 2014-215672 discusses a technique that provides a resource of a computer as a web service that can be used from a web application.

As an example, a plurality of printers of the same model is connected to the computer via USB and printing is performed via the web application using a specific printer out of the plurality of printers.

In WebUSB, when the web application requests access to the USB connected device, the web browser lists devices connected to the computer to a user. In the list of the connected devices, product names (e.g., name "B printer made by A company") created from vendorId and productId that are acquired from the USB device are displayed. The web application can access the connected device that has received connection permission from the user among the list of the connected devices.

In the above-described existing technique, in a case where a plurality of USB devices of the same model (e.g., "B printer made by A company") is connected to the computer, the same product names are displayed in the above-described list of connected devices. More specifically, in the above-described example, the plurality of "B printers made by A company" is displayed and cannot be identified from each other. In such a case, the user cannot identify the USB devices of the same model in the list, and it is difficult for the user to appropriately select the USB device that receives connection permission. This is because a vender name, a product name, etc., of the USB device can be acquired from a specification of the USB interface, but information enabling the user to identify the USB device cannot be acquired.

The technique discussed in Japanese Patent Application Laid-Open No. 2014-215672 cannot address a demand on selecting a specific resource (specific printer) from among a plurality of similar resources (plurality of printers of the same product in example described above) on the computer to use the specific resource.

As described above, the existing technique has an issue that, in the case where the plurality of devices of the same model is connected to the computer via USB, it is difficult for the user to identify the devices from each other on the web application. The issue occurs not only in the case where the devices are connected via USB but also in a case where the devices are connected via Bluetooth®, etc.

SUMMARY

According to an aspect of the present invention, an information processing apparatus, includes at least one memory storing a plurality of instructions related to a web browser, and at least one processor executing the instructions causing the information processing apparatus to: in a case where a web site including a web application is accessed from the information processing apparatus, perform an acquisition request to an operating system of the information processing apparatus to acquire information on each of a plurality of connected devices if an access request to access one of the connected devices connected to the information processing apparatus is executed based on the web application, provide a first screen for selection of a connected device from a list of information on the connected devices acquired based on the acquisition request, access to is the connected device being permitted to the web application, provide a second screen for setting of an identification name corresponding to the connected device selected in the first screen, and store, in a storage area, information on the connected device selected in the first screen and an identification name set in the second screen in association with each other.

Further features of the present invention will become apparent from the following description of exemplary embodiments with reference to the attached drawings.

DESCRIPTION OF THE EMBODIMENTS

Some exemplary embodiments of the present invention are described below with reference to drawings.

<System Configuration>

Figure 1:
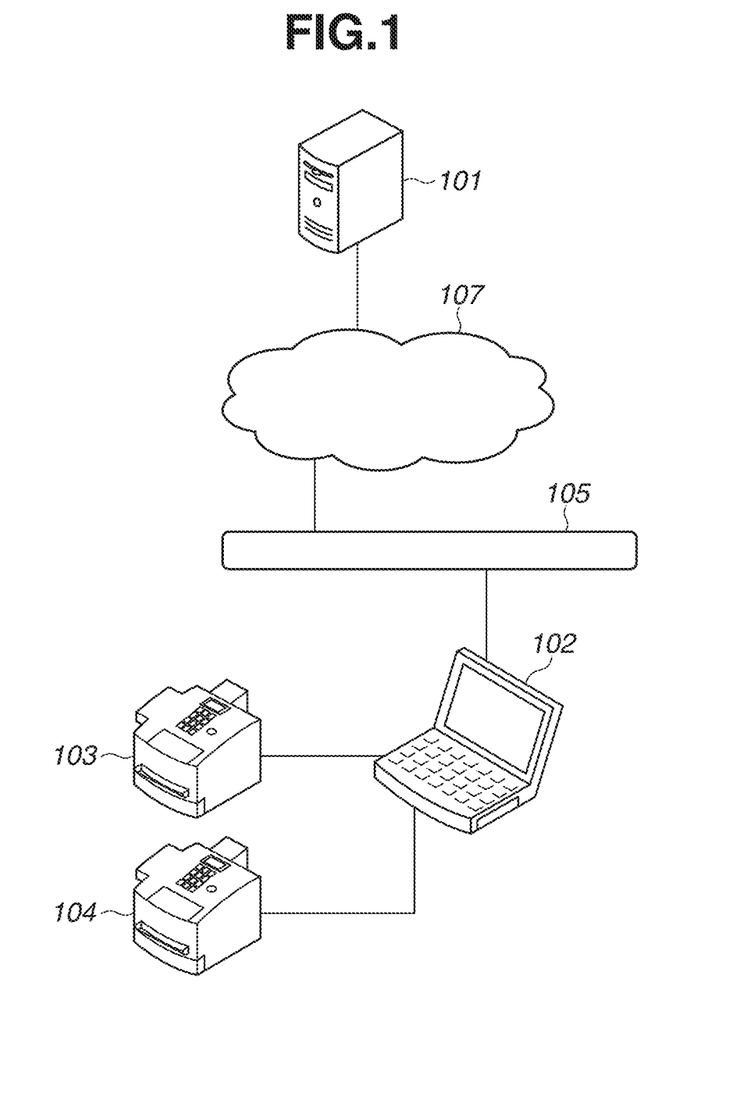
FIG. 1 is a diagram illustrating an example of an entire configuration of a system according to an exemplary embodiment.

FIG. 1 is a diagram illustrating an example of an entire configuration of a system including an information processing apparatus according to an exemplary embodiment of the present invention.

In FIG. 1, a web server 101 has a function to provide a web application to a client computer (hereinafter, "computer") 102. In this example, the server at least has the function to provide the web application to a browser. A sever on a cloud, a server in a data center, or a server in a computer can be used irrespective of location of the server.

The computer 102 is used by a user. Examples of the computer 102 include a personal computer, a laptop computer, a tablet computer, and a smartphone.

A device 103 and a device 104 are used by being connected to the computer 102. While, in the present exemplary embodiment, a universal serial bus (USB) printer is described as an example, the device is not limited thereto. While, in this example, as a method of connecting the computer 102 and the devices 103 and 104, wired connection via USB is described, this does not limit the scope of the present invention. The connection method may be wireless connection via Bluetooth®, etc. as long as the computer 102 can control the devices 103 and 104 via the connection.

A network 105 is a network to which the computer 102 is connected. The network 105 is not limited to a wired communication network, and may be a wireless communication network such as a wireless local area network (LAN) and a cellular phone communication network.

The web server 101 and the network 105 are each connected to the Internet 107. The web server 101 and the computer 102 can communicate with each other via the Internet 107.

<Hardware Configuration of Information Processing Apparatus>

Figure 2:
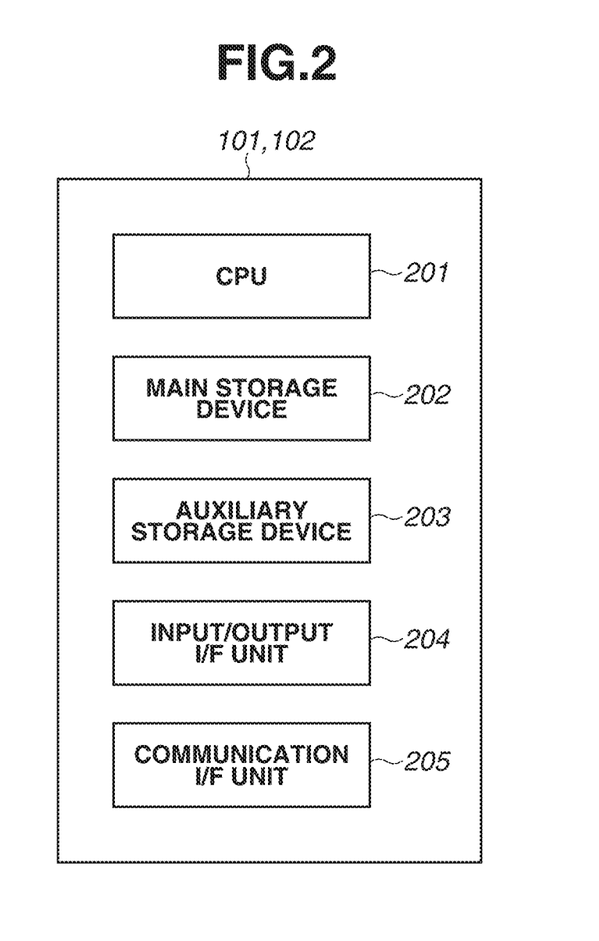
FIG. 2 is a diagram illustrating an example of a hardware configuration of an information processing apparatus according to the present exemplary embodiment.

FIG. 2 is a block diagram illustrating an example of a hardware configuration of an information processing apparatus configuring each of the web server 101 and the computer 102.

The information processing apparatus includes a central processing unit (CPU) 201, a main storage device 202, an auxiliary storage device 203, an input/output interface (I/F) unit 204, and a communication I/F unit 205.

The CPU 201 executes a predetermined program to instruct various types of control of the information processing apparatus. The main storage device 202 is a work memory which is used by the CPU 201 to execute the program and is realized by a random access memory (RAM), etc.

The auxiliary storage device 203 is a storage device for permanent storage of data, and is realized by a hard disk drive (HDD), a solid state drive (SSD), etc. The auxiliary storage device 203 stores an application program and an operation system (OS). A browser in the computer 102 described below is realized by the application program. The browser realized by the application program supports a WebUSB application programming interface (API). In the present exemplary embodiment, the devices 103 and 104 each support the WebUSB API. In a case where the devices 103 and 104 each support wireless connection via Bluetooth®, the devices 103 and 104 each support a WebBluetooth API. Various kinds of programs stored in the auxiliary storage device 203 are loaded to the main storage device 202 and are executed when the CPU 201 executes the programs.

The input/output I/F unit 204 includes a unit that has a function to receive operation input from the user and a unit that has a function to present information to the user. Specific examples of the unit that has the function to receive operation input include a mouse and a keyboard. Specific examples of the unit that has the function to present information to the user include a monitor and a speaker.

The communication I/F unit 205 is an interface to receive data from an external apparatus and to transmit data to the external apparatus. The communication I/F unit 205 can provide various kinds of information stored in the auxiliary storage device 203 held by the information processing apparatus, to the external apparatus using a prescribed protocol. The communication I/F unit 205 communicates with the external apparatus based on the various kinds of programs executed by the CPU 201. Examples of a type of the protocol include hypertext transfer protocol (HTTP), a simple network management protocol (SNMP), and a protocol for serial communication, USB communication, and Bluetooth® communication. While the computer 102 includes a USB interface in the communication I/F unit 205, the computer 102 may include a Bluetooth® interface.

Specific examples of the external apparatus include a USB device, a Bluetooth® device, a computer connected via the network, and the other network device.

<Hardware Configuration of Device>

Next, a hardware configuration of each of the devices 103 and 104 is described.

Figure 3:
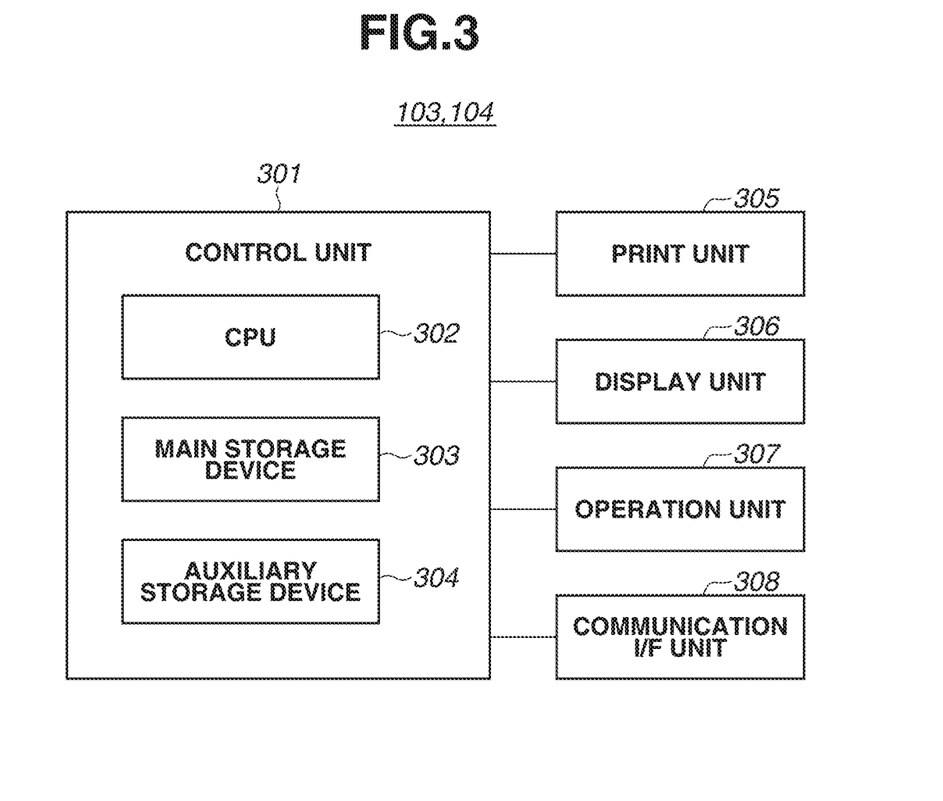
FIG. 3 is a diagram illustrating an example of a hardware configuration of a device according to the present exemplary embodiment.

FIG. 3 is a block diagram illustrating an example of the hardware configuration of each of the devices 103 and 104. While, in the present exemplary embodiment, a USB printer is described as an example of each of the device 103 and 104, the devices 103 and 104 are not limited thereto, and may be Bluetooth® devices or the like.

In each of the devices 103 and 104, a control unit 301 controls internal information on the device. The control unit 301 includes a CPU 302, a main storage device 303, and an auxiliary storage device 304. Description of the detail of the CPU 302, the main storage device 303, and the auxiliary storage device 304 is omitted because the CPU 302, the main storage device 303, and the auxiliary storage device 304 are respectively similar to the CPU 201, the main storage device 202, and the auxiliary storage device 203 of the information processing apparatus illustrated in FIG. 2.

A print unit 305 is a print mechanism that outputs image data received from the computer 102 on a sheet. A display unit 306 displays a print state and an operation menu to the user. Examples of the display unit 306 include a liquid crystal monitor. An operation unit 307 is a unit for the user to input operation, such as print, to be executed by the devices 103 and 104.

A communication I/F unit 308 is an interface for each of the devices 103 and 104 to communicate with the external apparatus. In the present exemplary embodiment, each of the devices 103 and 104 is connected to the computer 102 via USB, and the communication I/F unit 308 is a USB interface. Alternatively, the devices 103 and 104 may include a Bluetooth® interface, a network interface, etc., as the other functions.

<Entire Software Configuration of System>

Figure 4:
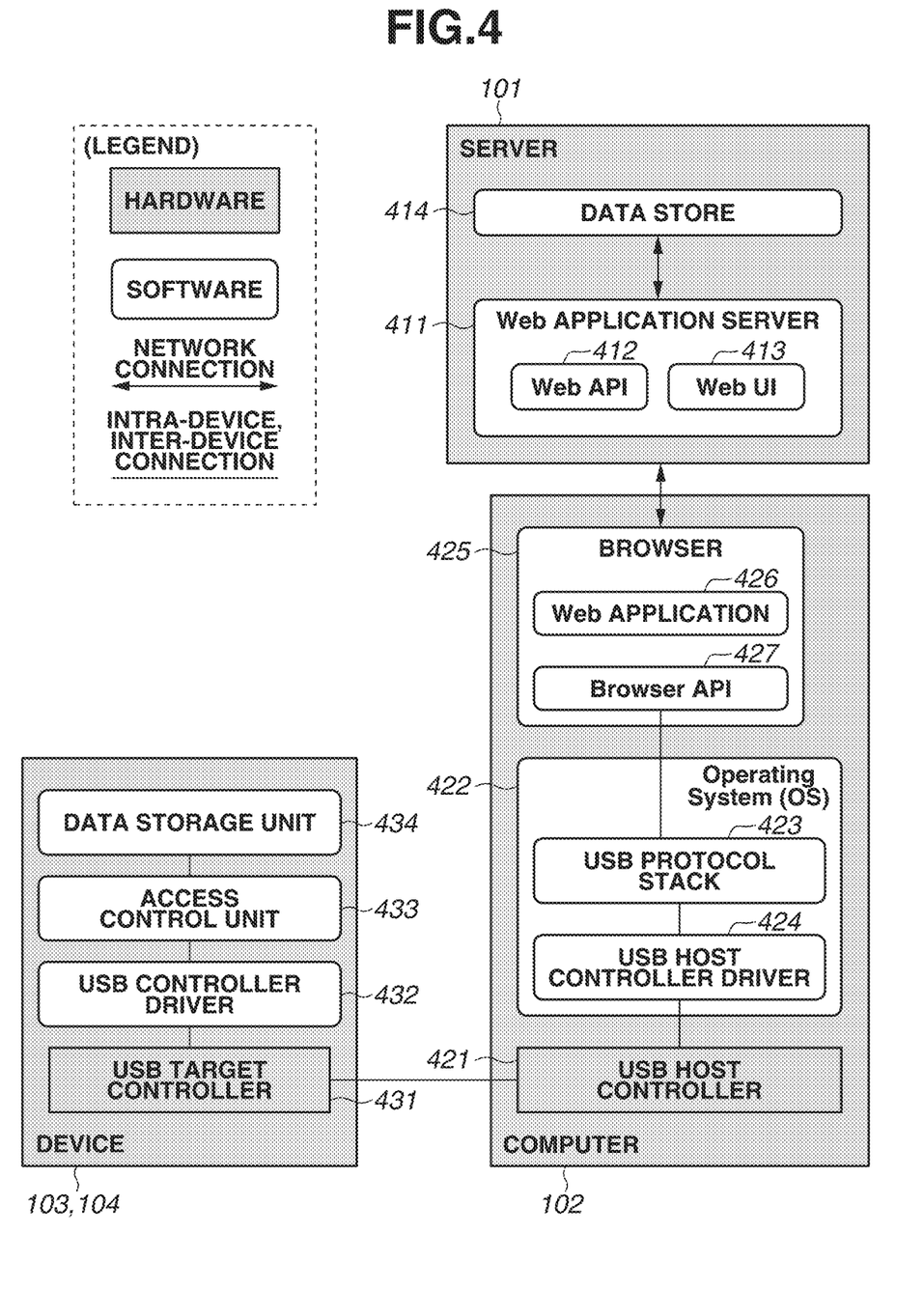
FIG. 4 is a diagram illustrating an example of a software configuration of the system according to the present exemplary embodiment.

FIG. 4 is a diagram illustrating an example of a software configuration of the system according to the present exemplary embodiment. Software installed in each hardware is executed by the CPU 201 of the information processing apparatus or the CPU 302 of each of the devices, and can communicate with each other as illustrated by an arrow of network connection.

<Configuration of Server 101>

A web application server 411 is realized and functions when the CPU 201 of the server 101 loads the program stored in the auxiliary storage device 203 to the main storage device 202 and executes the program. A data store 414 is realized as a storage area inside the auxiliary storage device 203 of the server 101.

The web application server 411 is installed in the server 101.

A web API 412 is provided by the web application server 411. A web user interface (UI) is provided by the web application server 411.

The data store 414 saves and stores data to be used by the web application server 411.

The web application server 411 returns a response based on contents of an HTTP request from the computer 102. For example, the web UI 413 returns a content file of a hypertext markup language (HTML), JavaScript®, etc., or the web API 412 returns extensible markup language (XML) data or JavaScript object notation (JSON) data.

<Configuration of Computer 102>

An OS 422 and a browser 425 are realized and function when the CPU 201 of the computer 102 loads the programs stored in the auxiliary storage device 203 to the main storage device 202 and executes the programs.

A USB host controller 421 is hardware to perform USB connection/communication.

An operating system (OS) 422 is installed in the computer 102. The OS 422 is basic software that manages and controls each hardware of the computer 102, and manages execution of various kinds of programs. The OS 422 internally includes a USB protocol stack 423, a USB host controller driver 424.

The USB protocol stack 423 includes a program module, a library, an API, etc. for use of the USB protocol. The USB host controller driver 424 drives and controls the USB host controller 421 in response to a command from the USB protocol stack 423.

A browser 425 is a web browser installed in the computer 102. The browser 425 is an application that displays and executes HTML and JavaScript®.

A web application 426 is an application executed on the browser. In the web application 426, scripts such as JavaScript® and European Computer Manufacturers Association script (ECMAscript) are executed. The browser 425 acquires HTML, JavaScript®, ECMAScript, etc. from the web application server 411 executed by the server 101 via the network, and executes and displays the acquired HTML, JavaScript®, ECMAScript, etc. as the web application 426.

A browser API 427 is an API in the browser 425. The browser API 427 is provided to enable the web application 426 to access a function provided by the OS 422.

<Configuration of Devices 103 and 104>

A USB controller driver 432 and an access control unit 433 are realized and function when the CPU 302 of each of the devices 103 and 104 loads the programs stored in the auxiliary storage device 304 to the main storage device 303 and executes the programs. A data storage unit 434 is realized as a storage area inside the auxiliary storage device 304 of each of the devices 103 and 104.

A USB target controller 431 is hardware in each of the devices 103 and 104, and performs USB connection/communication. A USB controller driver 432 is installed in each of the devices 103 and 104. The USB controller driver 432 drives and controls the USB target controller 431.

The access control unit 433 and the data storage unit 434 are in each of the devices 103 and 104. The access control unit 433 determines communication contents from the USB connection, controls permission to access the data storage unit 434, and controls reading/writing of necessary data.

<Browser Screen Configuration 1>

First, a case where the web application 426 is activated on the computer 102 for the first time is described.

Figure 5:
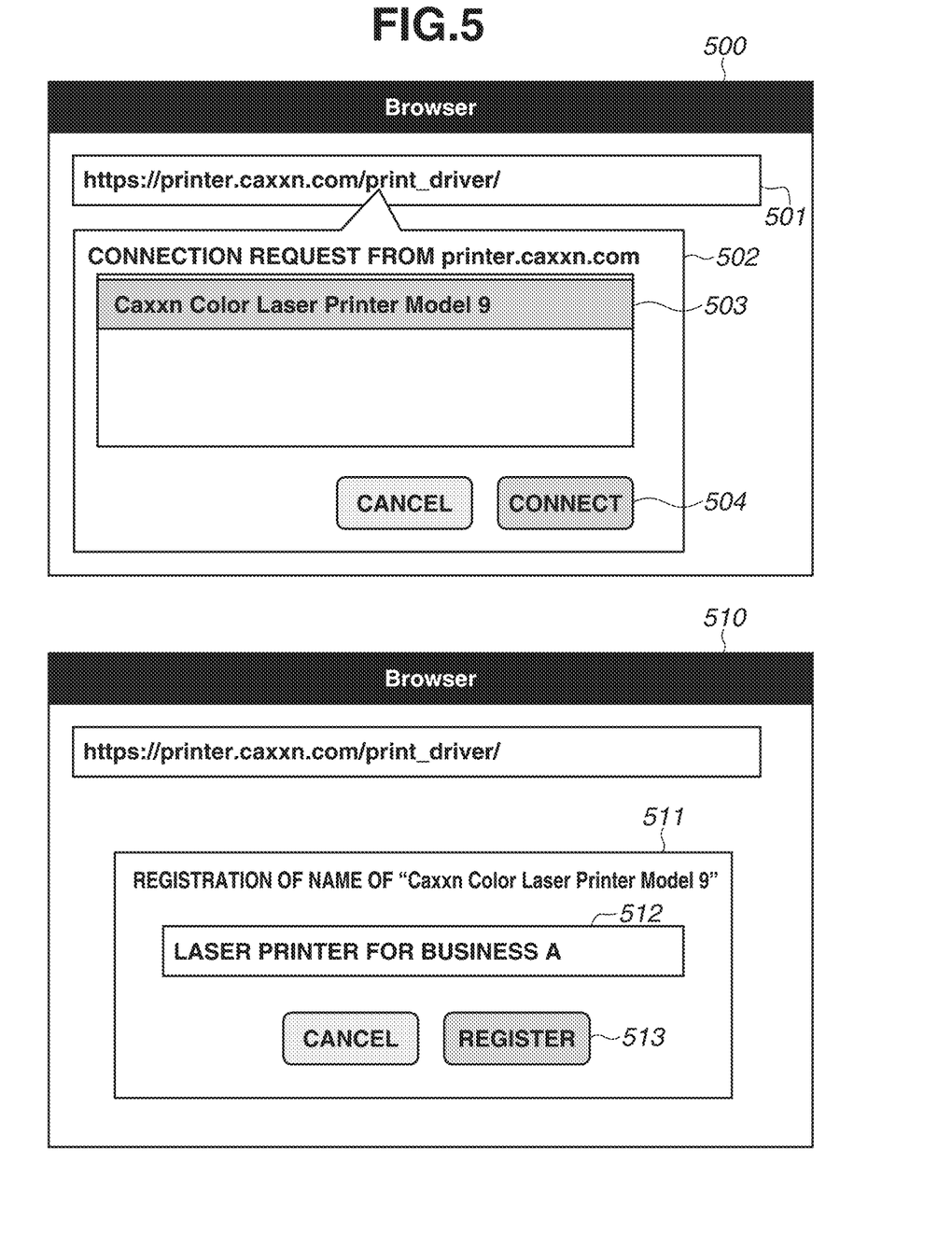
FIG. 5 is a diagram illustrating user interfaces (UIs) when access permission is provided to a web application according to a first exemplary embodiment.

FIG. 5 is a diagram illustrating an execution/display example of the web application acquired from the web server 101 on the browser 425 according to the first exemplary embodiment.

The example in FIG. 5 corresponds to a screen example when permission to access the USB device is acquired at the time of first activation of the web application 426 on the computer 102.

Description is given of a case in which the web application 426 acquired from the web server 101 is a print web application controlling the device 103 and the device 104 with use of WebUSB.

A screen 500 corresponds to a window of the browser 425 that executes and displays the print web application acquired from the web application server 411 via connection to the server 101. A uniform resource locator (URL) 501 is a URL of the web application server 411 opened on the browser 425.

A connection permission prompt 502 is a prompt for a domain of the web application server 411 to perform USB connection on the device connected to the computer 102 via WebUSB. A display example of the connection permission prompt 502 corresponds to a display example in a state where one device 103 is connected to the computer 102.

A connection destination device option 503 is an option of a WebUSB connection destination device. In a case where a plurality of devices is connected to the computer 102, the plurality of devices is displayed as options.

A "CONNECT" button 504 is a button control to perform operation to permit WebUSB connection. A user selects a target device, access to which is permitted to the web application 426, from the connection destination device option 503, and permits connection to the selected device by pressing the "CONNECT" button 504.

A screen 510 is a prompt to assign a name to the device displayed after connection permission in the screen 500. In the screen 510, a name registration prompt 511 that includes an input field for name registration of the device selected in the screen 500 is displayed.

The name registration prompt 511 is a prompt to register a name to the device 103.

An input field 512 receives input of the device name (identification name) from the user. As an input example a case in which the name "laser printer for business A" is assigned to the device having a product name "Caxxn Color Laser Printer Model 9" is illustrated.

A "REGISTER" button 513 is a button control for the user to execute registration of the identification name assigned to the device. When the user inputs the device name in the input field 512 and then presses the "REGISTER" button 513, the identification name is assigned to the device together with the connection permission setting instructed in the screen 500, and is stored in the browser 425. In a case where the identification name already stored in the browser 425 has been input in the input field 512, this may be notified to the user to prompt the user to input the other identification name in the input field 512.

<Sequence Diagram>

Figure 6:
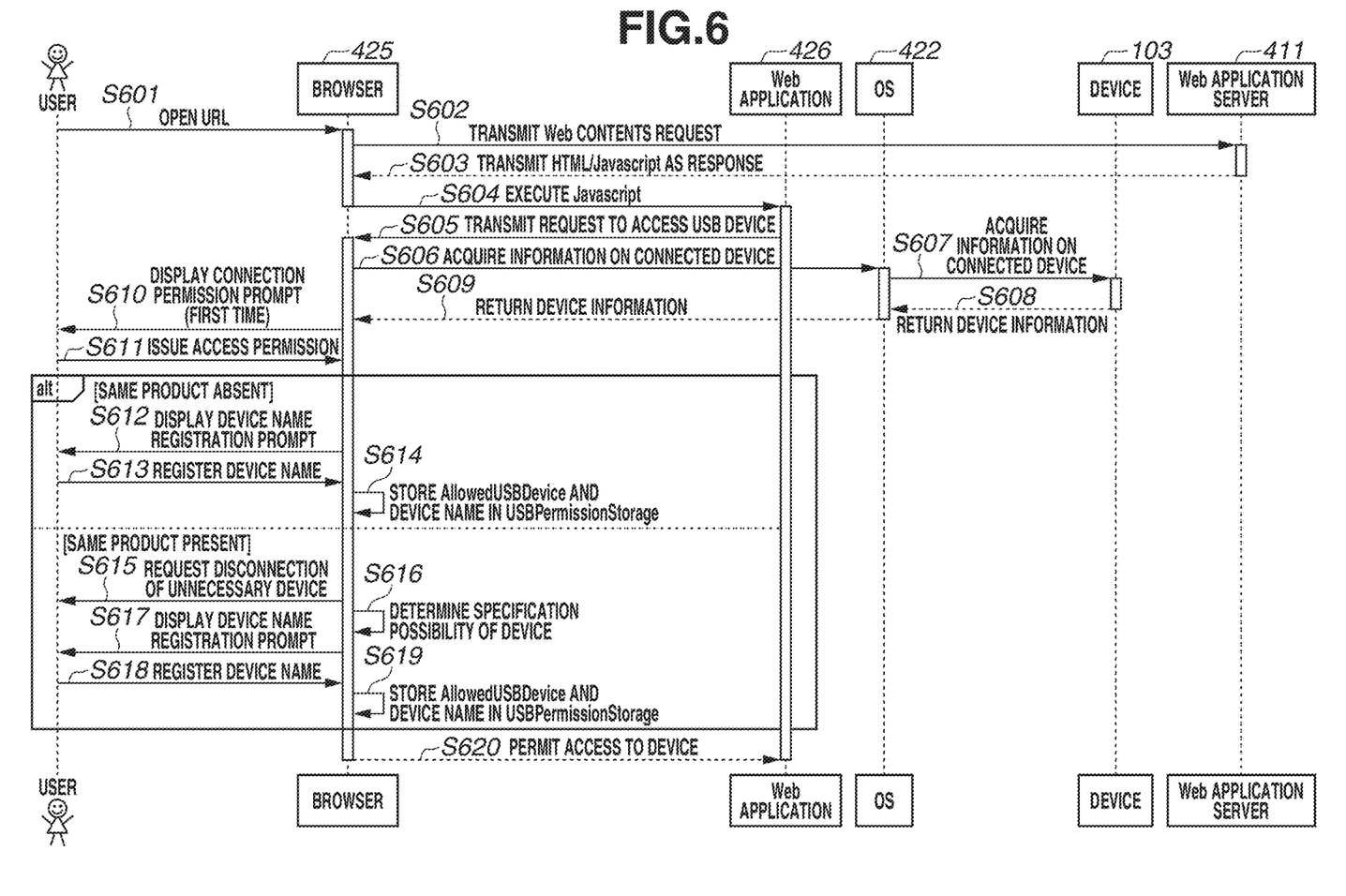
FIG. 6 is a sequence diagram illustrating web application execution processing according to the first exemplary embodiment.

FIG. 6 is a sequence diagram illustrating execution processing of the web application 426 according to the first exemplary embodiment.

In step S601, the user designates the URL (e.g., URL presented in URL 501 of FIG. 5) of the web site including the web application server 411 to the browser 425, and opens the print web application.

In step S602, in response to the user operation in step S601, the browser 425 accesses the web application server 411, and transmits a web contents request.

In step S603, in response to the request in step S602, the web application server 411 transmits the contents such as HTML/JavaScript® for the print web application to the browser 425 as a response. While, in this example, JavaScript® is described, ECMAScript or the like may be transmitted.

Upon receiving the response in step S603, the browser 425 analyzes the received HTML. When detecting the script such as JavaScript® and ECMAScript, the browser 425 executes the script as the web application 426 in step S604.

In step S605, the web application 426 executed in step S604 commands usb.requestDevice to the browser 425. In other words, the web application 426 requests access to a connected device.

In step S606, in response to the command in step S605, the browser 425 requests the OS 422 to acquire information on the connected device.

In step S607, in response to the request in step S606, the OS 422 requests idVendor and idProduct of Device Descriptor and productName and serialNumber of String Descriptor to the connected device (connected device 103 in example of FIG. 6).

In step S608, in response to the request in step S607, the device 103 returns idVendor and idProduct of Device Descriptor and productName and serialNumber of String Descriptor to the OS 422. Here, idVendor is an identifier for identification of a vendor of the device, idProduct is an identifier for identification of a product of the device, productName represents a product name of the device, and serialNumber represents a serial number of the device.

While, in the example of FIG. 6, one device is connected to the computer 102, a plurality of USB devices may be connected to the computer 102. In this case, steps S607 and S608 are repeatedly executed by the number of connected devices.

After the OS 422 acquires information on all of the devices connected to the computer 102, the OS 422 returns the information on all of the devices to the browser 425 in step S609.

Depending on the mounting state of the OS 422, the OS 422 stores the information such as Device Descriptor and String Descriptor when the device is connected to the computer 102. In the case of such a configuration, the processing in steps S607 and S608 may be cancelled, and the OS 422 may return the above-described stored device information to the browser 425.

The browser 425 generates a list of all of the USB devices connected to the computer 102, based on the information returned from the OS 422 in step S609. Further, in step S610, the browser 425 displays the connection permission prompt 502 that presents the list of USB devices as the option 503, on the browser screen 500.

Based on the prompt display in step S610, the user determines to provide access permission of which USB device to the web application 426, from the displayed connection permission prompt 502. When the user determines the USB device, the user selects the device 103, access to which is permitted, from the option 503 to issue access permission in step S611.

In response to the user operation to issue the access permission in step S611, the browser 425 performs the following control.

<Case Where Selected Device can be Uniquely Specified>

First, for example, a case where the selected device can be uniquely specified as illustrated in the screen 500 of FIG. 5, namely, a case where a product same as the selected device is not connected to the computer 102 is described.

In this case, in step S612, the browser 425 displays a prompt (e.g., prompt 511 in FIG. 5) to register and set an identification name to the selected device in order to identify the device in a case in which the same products are simultaneously connected later.

In step S613, in response to the prompt display in step S612, the user performs operation to register the device name (identification name) in the prompt to register and set the identification name to the device.

In step S614, in response to the device name registration operation in step S613, the browser 425 stores, in USBPermissionStorage, the domain name of the web application server 411, information on AllowedUSBDevice, and the device name (identification name) in association with one another. As the information on AllowedUSBDevice, the information on idVendor, idProduct, and serialNumber are stored. In addition, USBPermissionStorage is a storage area in the computer 102 managed by the browser 425.

After the above-described processing, in a case where access is requested from the web application corresponding to the domain name associated with the information on the connected device in a state where the connected device having the identification name set by the user as described above is connected to the computer 102, the browser 425 displays the connection permission prompt that presents the identification name as the connection destination device option. Even in a case where access is requested from the other web application not corresponding to the above-described domain name in the above-described state, the browser 425 can display the connection permission prompt that presents the above-described set identification name as the connection destination device option.

In the case where access is requested from the web application corresponding to the above-described domain name in the above-described state, the browser 425 may permit access to the connected device associated with the above-described domain name without displaying the connection permission prompt 502.

<Case where Selected Device Cannot be Uniquely Specified>

Next, a case where the selected device cannot be uniquely specified as illustrated in, for example, a screen 900 of FIG. 9 described below, namely, a case where a plurality of products same as the selected device is connected to the computer 102 is described. In this case, in step S615, the browser 425 requests the user to disconnect unnecessary devices as illustrated in, for example, a screen 910 of FIG. 9 described below. In response to the request, the user disconnects the unnecessary devices.

Upon acquiring a disconnection event of the USB devices, the browser 425 checks in step S616 whether the device can be uniquely specified. When the selected device, access to which is permitted by the user, can be uniquely specified, the browser 425 displays the prompt to register and set the identification name to the device in step S617, as with step S612.

In step S618, in response to the prompt display in step S617, the user performs operation to register the device name (identification name) in the prompt to register and set the identification name to the device, as with step S613.

In step S619, in response to the device name registration operation in step S618, the browser 425 stores, in USBPermissionStorage, the information on AllowedUSBDevice and the device name (identification name) in association with the domain name of the web application server 411. The processing is similar to the processing in step S614. Therefore, detailed description of the processing is omitted.

After the processing in step S614 or step S619, in step S620, the browser 425 permits the web application 426 to access the USB device selected in step S611. Although not illustrated, the web application 426 then displays, for example, a screen (e.g., screen 800 of FIG. 8 described below) to provide a function of the USB device to the user via WebUSB, on the browser 425.

<Browser Screen Configuration 2>

Next, a case where the web application 426 has been activated on the computer 102 in the past is described.

Figure 7:
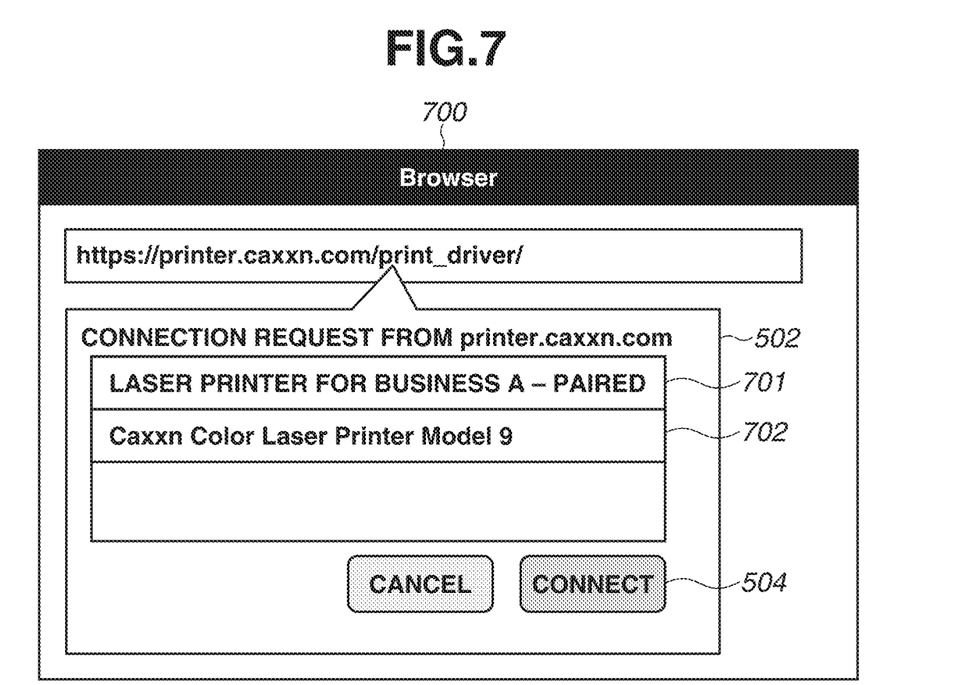
FIG. 7 is a diagram illustrating the UI when access permission is provided to the web application according to the first exemplary embodiment.

FIG. 7 is a diagram illustrating an execution/display example of the web application acquired from the web server 101 on the browser 425 of the computer 102.

The example in FIG. 7 corresponds to a screen example when permission to access the USB device is acquired in a case where the user has permitted the print web application to access the device in the past and the USB device assigned with the name and the USB device not assigned with the name are present together. In the sequence of FIG. 6, the example corresponds to a screen example when the name is registered to the USB device in step S614 or S619, and access is then performed again to display the access permission screen.

A screen 700 corresponds to a window of the browser 425 that executes and displays the print web application acquired from the web application server 411 via connection to the server 101. Two printers each having a product name "Caxxn Color Laser Printer Model 9" are connected to the computer 102 via USB.

In FIG. 7, in a connection destination device option 701, the device name "laser printer for business A" that has been previously registered by the user in step S614 or S619 in FIG. 6 is displayed instead of productName, etc. The device corresponding to the connection destination device option 701 is stored in the browser 425 as the device that has received access permission at the first connection. Therefore, "PAIRED" is displayed in display information. The device name "laser printer for business A" previously registered and productName, etc. may be displayed together.

The connection destination device option 701 corresponds to the option in which the device can be uniquely specified because the device name is registered with respect to serialNumber of the USB device.

A connection destination device option 702 corresponds to an option in which initial productName is still displayed because the device name has not been registered by the user.

The other part of display is similar to the screen 500 of FIG. 5. Therefore, description is omitted.

Figure 8:
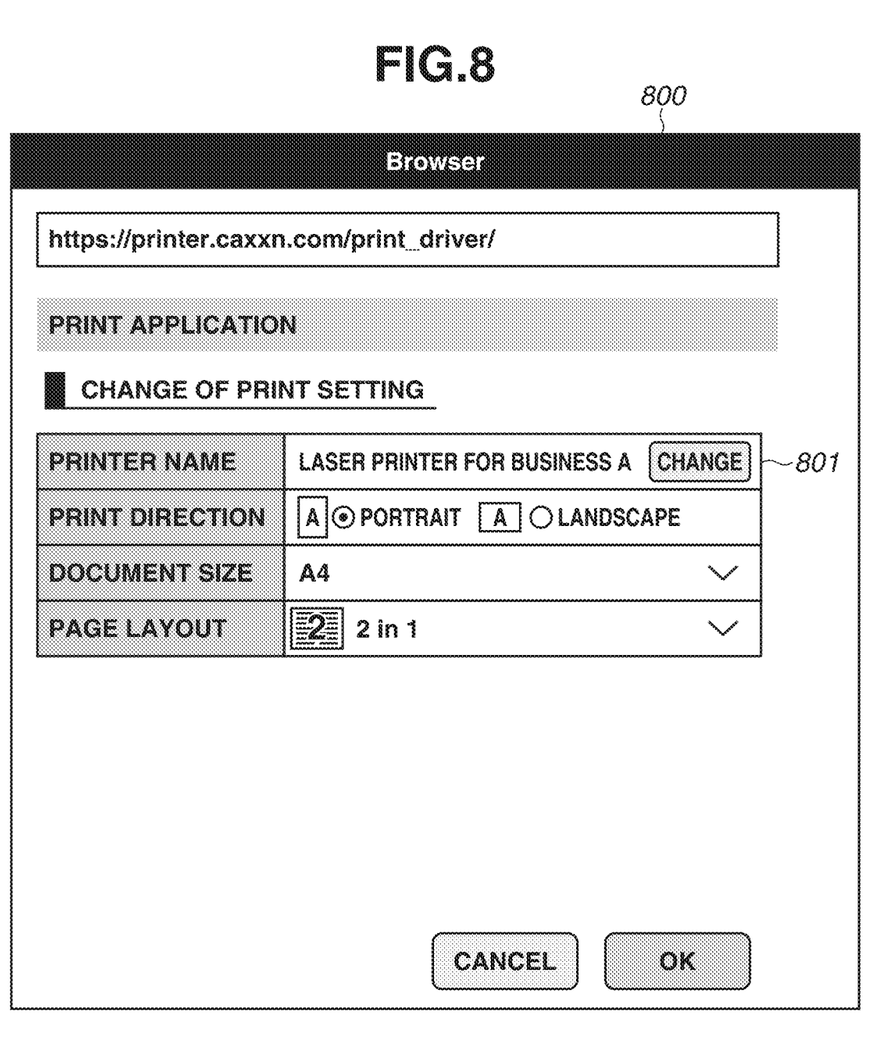
FIG. 8 is a diagram illustrating a print web application UI according to the present exemplary embodiment.

FIG. 8 is a diagram illustrating an execution/display example of the web application 426 acquired from the web server 101 on the browser 425. In particular, FIG. 8 illustrates a screen example in which the web application 426 provides a print function to the user via WebUSB after the name is registered to the USB device in step S620 in the sequence diagram of FIG. 6.

In FIG. 8, a screen 800 corresponds to a window of the browser 425 that executes and displays the print web application acquired from the web application server 411 via connection to the server 101.

The screen 800 includes an application title and a setting change field for printing.

A target printer name 801 displays a registered name ("laser printer for business A" in example of FIG. 8) that is the device name registered when the user issues access permission. This enables unique specification of the USB device and can prevent mistake of the controlled target device.

In addition, in the screen 800 of the print application, portrait/landscape setting, a sheet size, page layout, etc. for printing are settable.

<Browser Screen Configuration 3>

Figure 9:
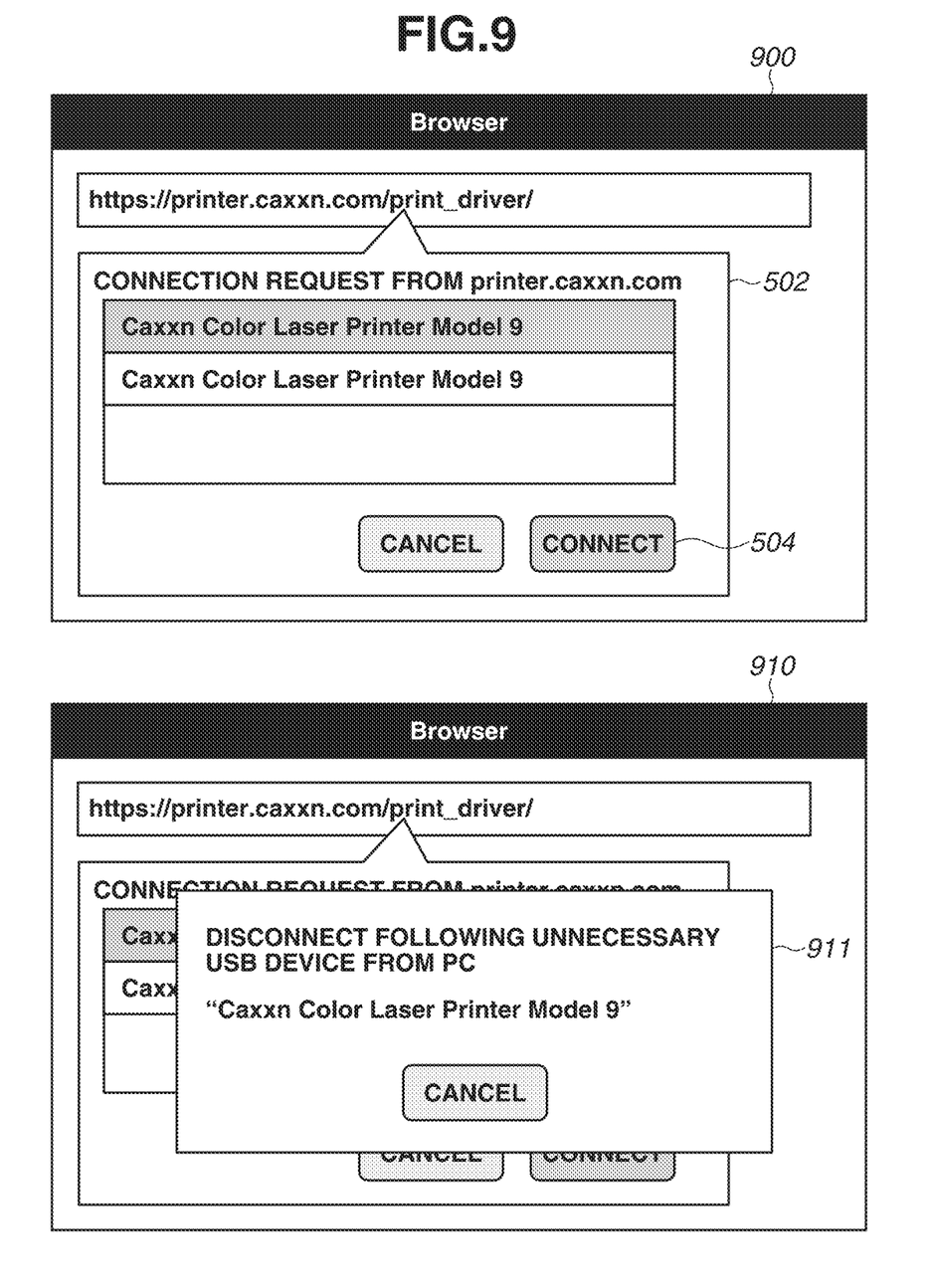
FIG. 9 is a diagram illustrating the UIs when access permission is provided to the web application according to the first exemplary embodiment.

FIG. 9 is a diagram illustrating an execution/display example of a web application acquired from the web server 101 on the browser 425 according to the first exemplary embodiment. The example corresponds to a case where access permission has been issued in step S611 of FIG. 6 but the selected device cannot be uniquely specified from productName.

In a case where the plurality of USB devices of the same product is connected to the computer 102 and the device name has not been registered by the user, the same product names are listed in the connection permission prompt displayed in step S610 of FIG. 6 as illustrated in a screen 900. In this case, the user cannot specify the USB device. Consequently, the user selects one of the USB devices, and presses the "CONNECT" button 504.

When the "CONNECT" button 504 is pressed and the browser 425 detects that the USB device cannot be uniquely specified only from productName displayed as an option, the browser 425 displays a dialog in a screen 910, and prompts the user to disconnect unnecessary device (screen 910).

In the screen 910, a prompt 911 is displayed to request the user to disconnect the unnecessary device. Upon acquiring a disconnection event of the USB device, the browser 425 checks whether the device can be uniquely specified. When the selected device, access to which is permitted by the user, can be uniquely specified, the browser 425 displays the prompt 511 to register and set an identification name to the device as illustrated in the screen 510 of FIG. 5.

As described above, in the present exemplary embodiment, even in the case where the specific device is used from the computer that is connected to the plurality of devices of the same product via USB (or Bluetooth®), the user can easily identify and use the device.

Figure 10A:
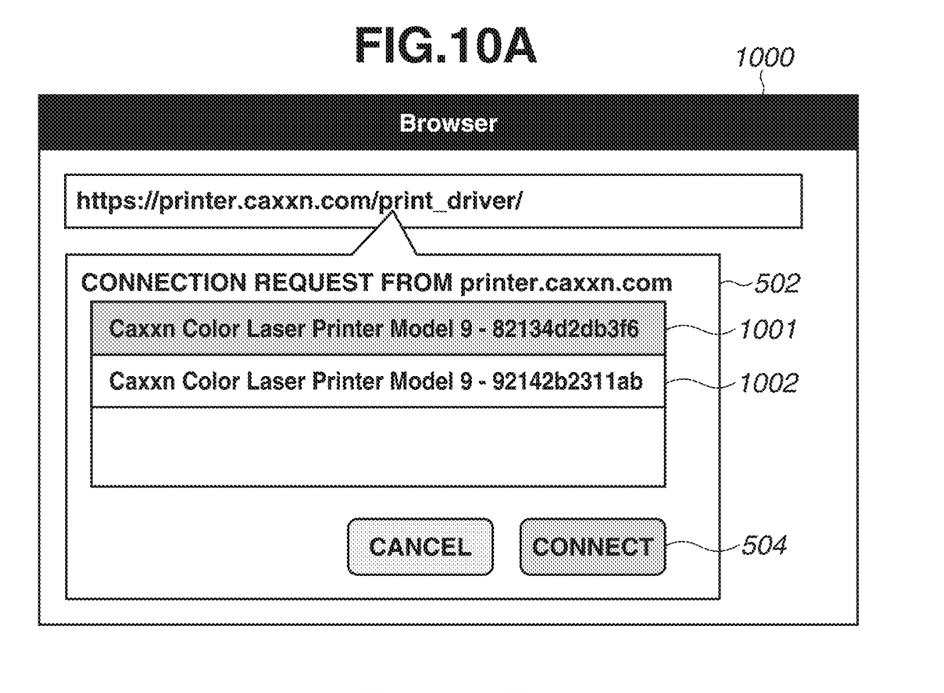
FIG. 10A is a diagram illustrating a UI when access permission is provided to a web application according to a second exemplary embodiment.

FIG. 10A is a diagram illustrating an identification method in a case where a plurality of devices of the same product is connected to the computer 102 according to a second exemplary embodiment.

In an example illustrated in a screen 1000, a serial number of the USB is displayed together with the product name as the connection destination device option of the connection permission prompt 502. The browser 425 acquires serialNumber from String Descriptor of the USB, and outputs serialNumber together with productName, etc., whereby a connection destination device option 1001 is output.

A specific example is described below. In the example of the connection destination device option 1001, a device that has a product name "Caxxn Color Laser Printer Model 9" based on productName, etc. and a serial number "82134d2db3f6" based on serialNumber is displayed as the option. In an example of a connection destination device option 1002, a device that has a product name "Caxxn Color Laser Printer Model 9" based on productName, etc. and a serial number "92142b2311ab" based on serialNumber is displayed as the option.

As described above, according to the second exemplary embodiment, the serial number of the USB is displayed together with the product name Therefore, even in the case where the product names are the same as each other, the user can easily grasp that the different devices are connected. Further, the user can check that the displayed serial number is provided to the device connected to which port of the computer 102, from a device manager of the OS. Therefore, the user can identify the device.

Figure 10B:
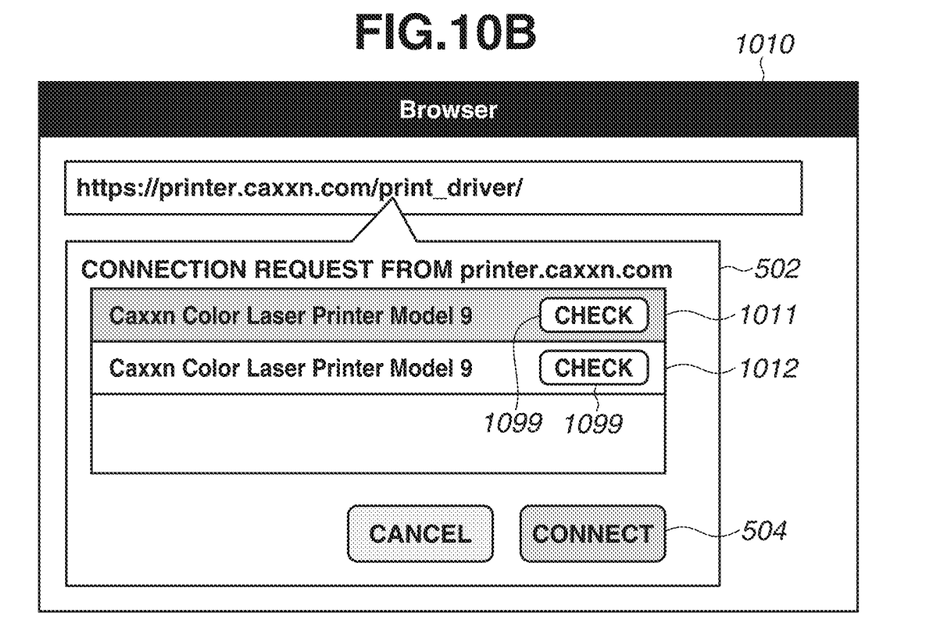
FIG. 10B is a diagram illustrating a UI when access permission is provided to a web application according to a third exemplary embodiment.

FIG. 10B is a diagram illustrating an identification method in a case where a plurality of devices of the same product is connected to the computer 102 according to a third exemplary embodiment.

In the third exemplary embodiment, a processing command like usb.notify( ) that causes the USB device to perform predetermined operation is previously mounted. Further, as illustrated in options 1011 and 1012 of a screen 1010, a "CHECK" button 1099 is prepared together with the product name in the connection permission prompt 502. The "CHECK" button 1099 is an instruction portion to instruct the corresponding connected device to perform notification operation. When the user presses the "CHECK" button 1099, the browser 425 requests the OS 422 to perform processing that issues a notification command usb.notify( ) to the USB device corresponding to the pressed "CHECK" button 1099. As a result, the OS 422 performs the notification processing on the designated device. If the device includes a light emitting unit such as a light-emitting diode (LED), the light emitting unit emits light (e.g., blinks) in a predetermined form. If the device includes a display unit, the display unit displays a predetermined display (e.g., message display). If the device includes a speaker, predetermined sound (e.g., beep sound) is reproduced from the speaker. It is sufficient for the corresponding device to perform any notification operation when the browser 425 performs usb.notify( ). The configuration at least includes a mechanism that the user having pressed the "CHECK" button 1099 can physically identify the target device using the human senses by checking the above-described notification operation of the device.

<Sequence Diagram>

Figure 11:
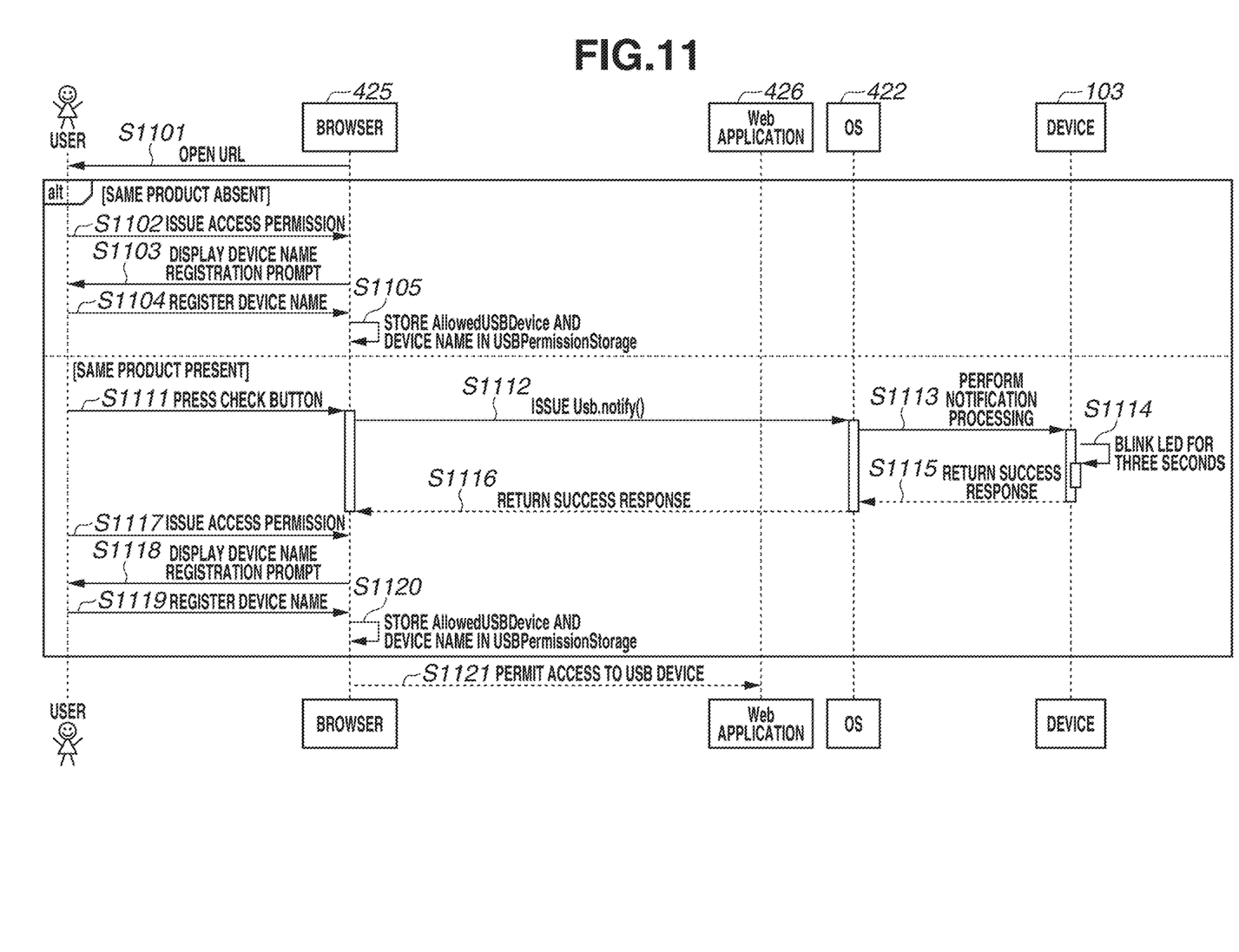
FIG. 11 is a sequence diagram illustrating web application execution processing according to the third exemplary embodiment.

FIG. 11 is a sequence diagram illustrating processing when the "CHECK" button 1099 in FIG. 10B is pressed according to the third exemplary embodiment. Illustration of a sequence similar to steps S601 to S609 in FIG. 6 according to the first exemplary embodiment is omitted.

In step S1101, the browser 425 displays the connection permission prompt 502 that includes the options 1011 and 1022 in FIG. 10B each including the USB device information and the "CHECK" button 1099, on the browser screen based on the information returned from the OS 422 in step S609 of FIG. 6.

When the display in step S1101 is performed, the user determines from the prompt 502 that access of which USB device is permitted to the web application 426. A case where the connected device can be uniquely specified and the case where the connected device cannot be uniquely specified are separately described.

<Case Where Connected Device can be Uniquely Specified>

In a case where the plurality of same products is not connected to the computer and the device can be identified, the user selects the device 103, access to which is permitted, from the options, and issues access permission in step S1102.

In step S1103, in response to the operation in step S1102, the browser 425 displays a prompt (e.g., prompt 511 in FIG. 5) to register the name to the selected device in order to identify the device in a case in which the same products are simultaneously connected later.

In step S1104, in response to the prompt display in step S1103, the user performs operation to register the device name in the prompt to register the name of the device.

In step S1105, in response to the device name registration operation in step S1104, the browser 425 stores the domain name of the web application server 411, the information on AllowedUSBDevice, and the device name in USBPermissionStorage. As the information on AllowedUSBDevice, the information on idVendor, idProduct, and serialNumber are stored.

<Case where Connected Device Cannot be Uniquely Specified>

In a case where the plurality of same products is connected to the computer and identification of the devices is difficult, the user presses the optional "CHECK" button 1099 on the displayed prompt in step S1111.

In step S1112, the browser 425 having received pressing of the "CHECK" button 1099 requests the OS 422 to perform the processing that issues the notification command usb.notify( ) to the USB device corresponding to the pressed "CHECK" button 1099.

In step S1113, the OS 422 having received the processing request in step S1112 performs the notification processing on the designated device 103.

In step S1114, the device 103 having received the notification processing in step S1113 performs the notification processing. For example, in the sequence example, the device 103 includes an LED, and performs processing to blink the LED for three seconds.

After the processing in step S1114 is completed, the device 103 returns a success response to the OS 422 in step S1115.

In step S1116, the OS 422 having received the success response in step S1115 returns a success response to the browser 425.

This enables the user to physically identify the device corresponding to the pressed "CHECK" button 1099.

After the user identifies the device in the above-described manner, the user selects the device 103, access to which is to be permitted, from the options, and issues access permission in step S1117.

In step S1118, in response to the operation in step S1117, the browser 425 displays a prompt (e.g., prompt 511 in FIG. 5) to register the name to the selected device in order to identify the device in a case in which the same products are simultaneously connected later.

In step S1119, in response to the prompt display in step S1118, the user performs operation to register the device name in the prompt to register the name of the device.

In step S1120, in response to the device name registration operation in step S1119, the browser 425 stores the domain name of the web application server 411, the information on AllowedUSBDevice, and the device name in USBPermissionStorage. As the information on AllowedUSBDevice, information on idVendor, idProduct, and serialNumber are stored.

After the processing in step S1105 or step S1120, in step S1121, the browser 425 permits the web application 426 to access the USB device selected in step S611. Although not illustrated, the web application 426 then displays, for example, a screen (e.g., screen 800 of FIG. 8) to provide a function of the USB device to the user via WebUSB, on the browser 425.

As described above, according to the third exemplary embodiment, the USB device is caused to actually perform the notification operation in response to the check operation by the user, which enables the user to easily identify each device even when the product names are the same.

According to the exemplary embodiments, when the access permission to the USB (or Bluetooth®) device is issued by the WebUSB (or WebBluetooth) technology, even in the case where the plurality of same products is connected to the computer, the plurality of same products can be identifiably displayed. Further, the target USB (or WebBluetooth) device can be identified and controlled while the web application is used, which makes it possible to prevent erroneous processing from being executed.

In the above description, the case of the device that is connected to the computer 102 via USB (or Bluetooth®) has been described. The connection between the computer 102 and the device, however, is not limited to USB or Bluetooth®, and the exemplary embodiments of the present invention are similarly applicable to connection based on the other similar standard.

Even in the case where the specific device is used from the web application on the computer to which the plurality of devices of the same product is connected as described above, it is possible to easily identify and use the specific device.

The configuration and the contents of the above-described various kinds of data are not limited to those described above, and the various kinds of data include various configurations and contents depending on an application and a purpose.

Although the exemplary embodiments have been described above, the present invention can be embedded as, for example, a system, an apparatus, a method, a program, or a storage medium. More specifically, the exemplary embodiments may be applied to a system including a plurality of devices, or an apparatus including a single device.

Further, all of combined configurations of the above-described exemplary embodiments are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-038207, filed Mar. 4, 2019, which is hereby incorporated by reference herein in its entirety.

What is claimed is:
1. An information processing apparatus, comprising:
at least one memory storing a plurality of instructions related to a web browser; and
at least one processor executing the instructions causing the information processing apparatus to:
in a case where a web site is accessed from the information processing apparatus, perform an acquisition request to an operating system of the information processing apparatus to acquire information on one or more connected devices if an access request to access one of the one or more connected devices connected to the information processing apparatus is executed based on a function included in data provided by the web site;
provide a first screen for selection of a connected device, to which access by the web site is permitted, from a list based on information on the one or more connected devices acquired based on the acquisition request;
provide a second screen for setting of an identification name corresponding to the connected device selected in the first screen;
in a case where a connected device is selected via the first screen as a device to which access is permitted and an identification name is set in the second screen, store, in a storage area, information on the connected device selected in the first screen and the identification name set in the second screen in association with each other, wherein an identification name is neither set nor stored in the storage area for other connected devices not selected via and first screen as a device to which access is permitted, and
when another acquisition request is performed and the stored information on the connected device is included in information of one or more connected devices acquired based on the another acquisition request, provide the first screen based on the stored identification name and the acquired information of one or more connected devices.
2. The information processing apparatus according to claim 1, wherein the connected devices are connected to the information processing apparatus via universal serial bus (USB) or Bluetooth®.

3. The information processing apparatus according to claim 1, wherein information corresponding to the web site is further associated and stored in the storage area in addition to the information on the connected device selected in the first screen and the identification name set in the second screen.

4. The information processing apparatus according to claim 1, wherein the instructions further cause the information processing apparatus to provide a third screen for instructing disconnection of a connected device, access to the connected device is not permitted to the web site, from the information processing apparatus, in a case where same pieces of information are displayed as connected devices different from each other in the list in the first screen.

5. The information processing apparatus according to claim 1, wherein the information on the connected device acquired based on the acquisition request includes at least any of information for identification of a vendor of the connected device, and information for identification of a product name of the connected device.

6. The information processing apparatus according to claim 1,
wherein the information on the connected device acquired based on the acquisition request includes a serial number of the connected device, and
wherein the serial number is displayed as the information on each of the connected device displayed in the list in the first screen.

7. The information processing apparatus according to claim 1,
wherein the first screen includes an instruction portion configured to instruct each of the connected devices corresponding to the information displayed in the list to perform notification operation, and
wherein the instructions further cause the information processing apparatus to request the operating system to issue a command that causes the connected device instructed by the instruction portion to perform the notification operation.

8. The information processing apparatus according to claim 7, wherein the notification operation includes at least any of a light emitting operation by a light emitting unit included in the connected device in a predetermined form, a predetermined display operation by a display unit included in the connected device, and a predetermined sound reproducing operation by a speaker included in the connected device.

9. A method for a web browser, the method comprising:
in a case where a web site is accessed from the web browser, performing an acquisition request to an operating system of an information processing apparatus to acquire information on one or more connected devices if an access request to access one of the one or more connected devices connected to the information processing apparatus is executed based on a function included in data provided by the web site;
providing a first screen for selection of a connected device, to which access by the web site is permitted, from a list based on information on the one or more connected devices acquired based on the acquisition request;
providing a second screen for setting an identification name corresponding to the connected device selected in the first screen;
in a case where a connected device is selected via the first screen as a device to which access is permitted and an identification name is set in the second screen, storing, in a storage area, information on the connected device selected in the first screen and the identification name set in the second screen in association with each other, wherein an identification name is neither set nor stored in the storage area for other connected devices not selected via the first screen as a device to which access is permitted, and
when another acquisition request is performed and the stored information on the connected device is included in information of one or more connected devices acquired based on the another acquisition request, provide the first screen based on the stored identification name and the acquired information of one or more connected devices.

10. A non-transitory computer-readable storage medium having computer executable instructions stored thereon, wherein the instructions cause a computer as an information processing apparatus to:
in a case where a web site is accessed from the information processing apparatus, perform an acquisition request to an operating system of the information processing apparatus to acquire information on one or more connected devices if an access request to access one of the one or more connected devices connected to the information processing apparatus is executed based on a function included in data provided by the web site;
provide a first screen for selection of a connected device, to which access by the web site is permitted, from a list based on information on the one or more connected devices acquired based on the acquisition request;
provide a second screen for setting an identification name corresponding to the connected device selected in the first screen;
in a case where a connected device is selected via the first screen as a device to which access is permitted and an identification name is set in the second screen, store, in a storage area, information on the connected device selected in the first screen and the identification name set in the second screen in association with each other, wherein an identification name is neither set nor stored in the storage area for other connected devices not selected via the first screen as a device to which access is permitted, and
when another acquisition request is performed and the stored information on the connected device is included in information of one or more connected devices acquired based on the another acquisition request, provide the first screen based on the stored identification name and the acquired information of one or more connected devices.

* * * * *